E. H. ASHCROFT.
MACHINE FOR CLEANING PEAT.

No. 44,776.            Patented Oct. 25, 1864.

Witnesses:          Inventor;

UNITED STATES PATENT OFFICE.

EDWARD H. ASHCROFT, OF LYNN, MASSACHUSETTS.

IMPROVED MACHINE FOR CLEANING PEAT.

Specification forming part of Letters Patent No. 44,776, dated October 25, 1864.

*To all whom it may concern:*

Be it known that I, EDWARD H. ASHCROFT, of Lynn, in the county of Essex and State of Massachusetts, have invented an Improved Peat-Mill; and I do hereby declare that the following, taken in connection with the drawings which accompany and form part of this specification, is a description of my invention sufficient to enable those skilled in the art to practice it.

This invention relates to the treatment of peat for conversion into proper condition for use as fuel, the particular object of the invention being the separation of the finer or decomposed portions of the peat from the coarse and fibrous matters contained therein. To effect this separation I employ two rotating hollow drums or cylinders with perforated surfaces, so placed in juxtaposition that the peat fed into a hopper above them is compressed between the cylinders, the finer and more decomposed matter being expressed and driven by pressure through the perforations and being automatically removed from the interior of the cylinders, while the coarser and more fibrous matter passes between and drops below the cylinders. It is this construction and arrangement of mechanism which constitutes my invention.

Figure 1:
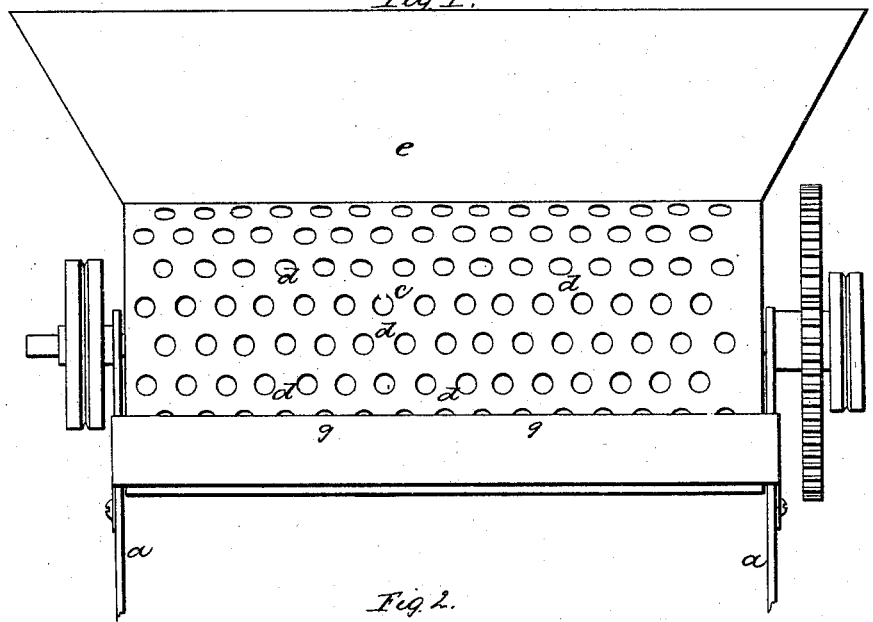
Figure 2:
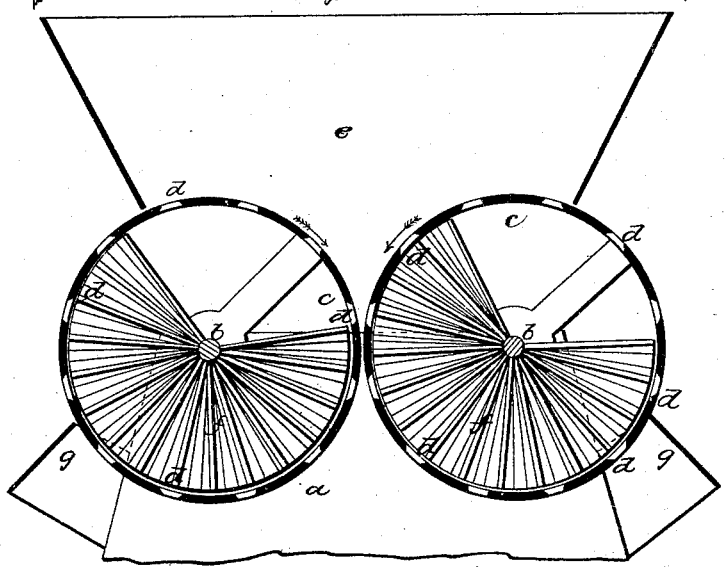

Figure 1 represents a side elevation of an apparatus embodying the invention, and Fig. 2 a vertical cross-section of the same.

$a$ denotes a frame-work supporting two horizontal shafts $b$, each of which carries a hollow drum or cylinder $c$, the cylinders being arranged with respect to each other, as seen in the drawings, and so geared as to rotate together in the direction of the arrows seen in Fig. 2, this rotary movement being imparted in any convenient manner. Each cylinder is perforated with holes $d$, which holes may be countersunk from the inner surface of the cylinders, so as to prevent such clogging of the holes as might take place if they were cylindrical. The cylinders may be surmounted by a hopper $e$, or the peat may be otherwise brought to their action, if desirable. Within each cylinder and rotating on the shaft $b$ is a clearing-screw $f$, extending throughout the length of each.

Figure 3:
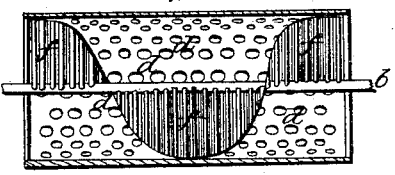

Fig. 3 shows one of the screws in elevation in its cylinder.

Peat, preferably in a wet state or in the condition it possesses as it is cut from its bed, being placed in the hopper or fed between the cylinders is carried down by the rotating surfaces and compressed between the cylinders, this compression forcing the soft and pulpy matter through the perforations, but carrying the long and fibrous material down between them until it drops below or is scraped from the inner surface of the cylinders by scrapers $g$. The decomposed or pulpy matter entering the cylinders and dropping to the bottom thereof is taken up and forced along by the rotating clearers $f$, and thereby fed out from the front ends of the cylinders. The screws may be so constructed as to move closely against the inner surfaces of the cylinders, to scrape therefrom any adhering portion of the peat.

Means may be provided, if necessary, for preventing the peat from dropping through the perforations on the under sides of the cylinders as they rotate, or to receive and deliver any peat which may drop through separately from the waste or fibrous material fed past the cylinders.

The cylinders may be made movable for the purpose of adjustment with respect to each other, either as to their distance apart or to their being placed upon an angle with each other. They are shown as supported in horizontal positions, but they may be inclined vertically if necessary.

The arrangement and size of the cylinders and the number and disposition of their perforations are such that the decomposed matters are pressed through the perforations before they come into contact with the nearest surfaces of the cylinders, so that but a very small percentage, if any, of such matter is passed through with the refuse.

Peat as it is cut from the bog generally contains a large admixture of fibrous and undecomposed roots and other matter, which form an objectionable ingredient in the preparation of this substance as fuel, both as regards its compression and desiccation and its combustibility. By extracting this fibrous matter, or separating the more decomposed portions therefrom the peat is left in the best possible condition for treatment by compression and drying and for conversion into charcoal—or, in other words, for conversion into an economic fuel. This separation is effected by the apparatus described in a more perfect and expeditious manner than has heretofore been accomplished in other machines constructed for a like purpose.

I claim—

1. The arrangement or combination of rotary perforated drums or cylinders to operate 2. Combining with the separating-cylinders the clearers $f$, operating in the manner substantially as set forth.

In witness whereof I have hereunto set my hand this 29th day of September, A. D. 1864.

E. H. ASHCROFT.

In presence of—